(12) United States Patent
Rochelle

(10) Patent No.: US 7,076,874 B2
(45) Date of Patent: Jul. 18, 2006

(54) FITTING AND PIPE SECTION FOR JETTED BATH HEATERS

(75) Inventor: Gary P. Rochelle, Marina Del Rey, CA (US)

(73) Assignee: AquaTemp Products Inc., Torrance, CA (US)

( * ) Notice: Subject to any disclaimer, the term of this patent is extended or adjusted under 35 U.S.C. 154(b) by 121 days.

(21) Appl. No.: 10/634,615

(22) Filed: Aug. 4, 2003

(65) Prior Publication Data

US 2004/0036274 A1 Feb. 26, 2004

Related U.S. Application Data

(62) Division of application No. 09/805,673, filed on Mar. 12, 2001, now abandoned.

(51) Int. Cl.
*B23P 6/00* (2006.01)

(52) U.S. Cl. .............. 29/890.14; 29/401.1; 29/402.01; 285/15; 285/31; 392/501

(58) Field of Classification Search ............ 29/890.14, 29/890.148, 401.1, 557, 890.032, 402.01, 29/402.09, 402.14; 4/492, 541.1; 285/415, 285/31, 32, 4, 387, 388, 15, 354; 392/501
See application file for complete search history.

(56) References Cited

U.S. PATENT DOCUMENTS

| | | | |
|---|---|---|---|
| 932,805 A | 8/1909 | McLaughlin | |
| 944,877 A | 12/1909 | Koschinski | |
| 1,078,552 A | 11/1913 | Patterson | |
| 2,297,966 A | 10/1942 | Luff | |
| 2,595,705 A | 5/1952 | Rosecrans, Sr. | |
| 2,871,032 A | 1/1959 | Woodling | |
| 3,288,494 A | 11/1966 | Callahan, Jr. et al. | |
| 3,332,709 A | 7/1967 | Kowalski | |
| 3,781,925 A * | 1/1974 | Curtis et al. .................... | 4/493 |
| 3,908,208 A * | 9/1975 | McIlroy ......................... | 4/679 |
| 4,594,500 A | 6/1986 | Wright | |
| 4,747,212 A | 5/1988 | Cavdek | |
| 4,810,008 A | 3/1989 | Brodie | |
| 5,393,103 A | 2/1995 | Cretzler | |
| 5,430,921 A * | 7/1995 | McGuire ................... | 29/401.1 |
| 5,724,478 A | 3/1998 | Thweatt | |
| 5,775,743 A * | 7/1998 | Rochelle ..................... | 285/349 |
| 5,872,890 A | 2/1999 | LaCombe | |
| 6,000,073 A | 12/1999 | Eddington | |
| 6,092,246 A | 7/2000 | Ludlow | |
| 6,154,608 A | 11/2000 | Rochelle | |
| 6,318,761 B1 | 11/2001 | Robertson | |
| 6,460,901 B1 * | 10/2002 | Rochelle ..................... | 285/387 |

\* cited by examiner

*Primary Examiner*—Jermie E. Cozart
(74) *Attorney, Agent, or Firm*—Christensen O'Connor Johnson Kindness PLLC (57) ABSTRACT

A method of modifying a bath to accept a heater (30) using a fitting and pipe section assembly (10) is provided. The method includes cutting the assembly (10) along first and second indicia (17A and 17B) disposed at the ends of a pipe section (12) and removing a center segment (16) of the pipe section (12), leaving first and second end fittings (18A and 18B) with a gap therebetween. The method further includes inserting the heater within the gap without displacement of the fittings and securing the heater in fluid communication with the fittings with a fastening assembly. A method of forming a fitting and pipe section assembly to permit the mounting of a heater in fluid communication with tubing of a bath is also provided. A method of modifying a segment of tubing of a jetted bath to accept a heater is further provided.

27 Claims, 13 Drawing Sheets

FITTING AND PIPE SECTION FOR JETTED BATH HEATERS

CROSS-REFERENCE TO RELATED APPLICATION

This application is a Divisional Application of U.S. patent application Ser. No. 09/805,673, filed Mar. 12, 2001 now abandoned, priority from the filing date of which is hereby claimed under 35 U.S.C. § 120 and 121, and the disclosure of which is hereby expressly incorporated by reference.

FIELD OF THE INVENTION

The present invention relates to methods for installing heaters for jetted baths, spas, above ground pools and the like, and particularly to methods for installing heaters in fitting and pipe sections that may be pre-installed to assist in the subsequent installation of a heater to the jetted bath.

BACKGROUND OF THE INVENTION

Jetted baths include tubing that circulates water from the bath, through a pump, and back into the bath through jets. Jetted baths may be provided with a heater in the tubing circuit, that acts to maintain bath-water temperature after filling. Often it is advantageous or necessary to install these devices after the initial construction of the jetted bath (or other personal soaking reservoir), or after home installation of the jetted bath. Post-construction installation of these devices enables a limited number of product variations to be produced by a manufacturer, which can be modified later to meet the particular needs of an end user. This has the advantage of limiting manufacturing and purchase costs.

However, at present, post-construction installation typically will depend on a skilled plumber to cut or open the tubing of a jetted bath and affix a device in fluid flow communication with the jetted bath. This is often expensive and inconvenient for the end user. Thus, there exists a need for a method for post-construction installation of a heater within a jetted bath that does not require a skilled plumber. Further, there exists a need for a method of post-construction installation of a heater that insures that the heater is placed and attached in a predetermined location and manner.

SUMMARY OF THE INVENTION

In accordance with one embodiment of the present invention, a method of modifying a jetted bath to accept a close fit heater device using a fitting and pipe section assembly adapted to be installed in a segment of tubing of the jetted bath is provided. The method includes cutting a fitting and pipe section assembly along a first indicia disposed at a first end of a center segment of a fitting and pipe section assembly. The method further includes removing the center segment from the fitting and pipe section assembly and defining a gap between a first end fitting and a second end fitting of the fitting and pipe section assembly. The method still further includes inserting a close fit heater device in the gap. The method still further yet includes securing the close fit heater device in fluid communication with the first and second end fittings with a fastening assembly.

In accordance with another embodiment of the present invention, a method of forming a fitting and pipe section assembly to permit the mounting of a close fit heater device in fluid communication with a segment of tubing of a jetted bath is provided. The method includes forming a first end fitting on a first end of a pipe section and a second end fitting is formed on a second end of the pipe section. The method further includes forming a first indicia between the first end fitting and the second end fitting to guide cutting of the pipe section. The method further still includes forming a second indicia between the first end fitting and the second end fitting to guide the cutting of the pipe section.

In accordance with still another embodiment of the present invention, a method of modifying a segment of tubing of a jetted bath to accept a close fit heater device is provided. The method includes forming a first end fitting is formed on a first end of a pipe section and a second end fitting is formed on a second end of the pipe section. The method further includes coupling the first and second end fittings in fluid communication with a segment of tubing of a jetted bath. The method still further includes forming a first cutting guide between the first end fitting and the first end fitting and the first end of the pipe section to guide the post installation cutting and removal of a center segment of the pipe section. The method still further yet includes forming a second cutting guide between the first end fitting and the second end fitting to guide the post installation cutting and removal of the center segment.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
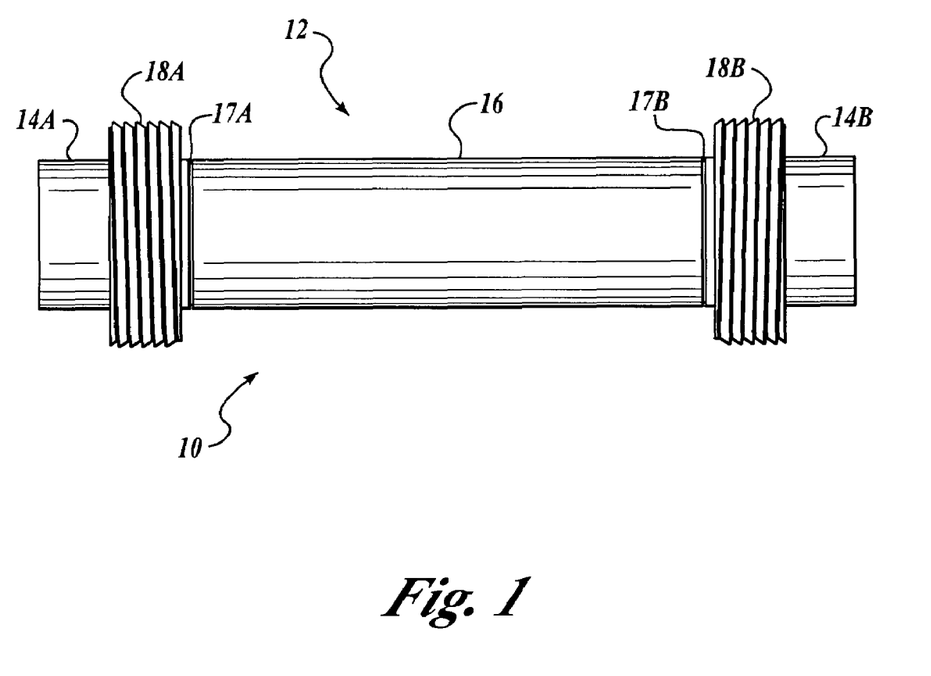
FIG. 1 is a side view of a fitting and pipe section according to the present invention.

A first embodiment of a fitting and pipe section assembly 10 constructed in accordance with the present invention is shown in FIG. 1. The fitting and pipe section assembly 10 is suitable for installation in an existing tubing network into which water is drawn, treated, and then reintroduced into a jetted bath. The fitting and pipe section assembly 10 makes it possible to modify previously constructed and/or installed jetted baths to accept a "water treatment device," which is intended herein to mean a heater for raising or maintaining bath-water temperature.

The fitting and pipe section assembly 10 includes a pipe section 12 and first and second fittings 18A and 18B, and is marked with first and second indicia 17A and 17B. The pipe section 12 has a center segment 16 disposed between inlet and outlet end portions 14A and 14B respectively. The first and second fittings 18A and 18B are disposed on the inlet and outlet portions 14A and 14B of the pipe section 12 respectively. The first and second indicia 17A and 17B on the pipe section 12 define the center segment 16 of the pipe section 12, and guide post-installation cutting of the pipe section 12 at predetermined points. In one embodiment, the fitting and pipe section 10 is a unitary/intergrally formed body.

Figure 2:
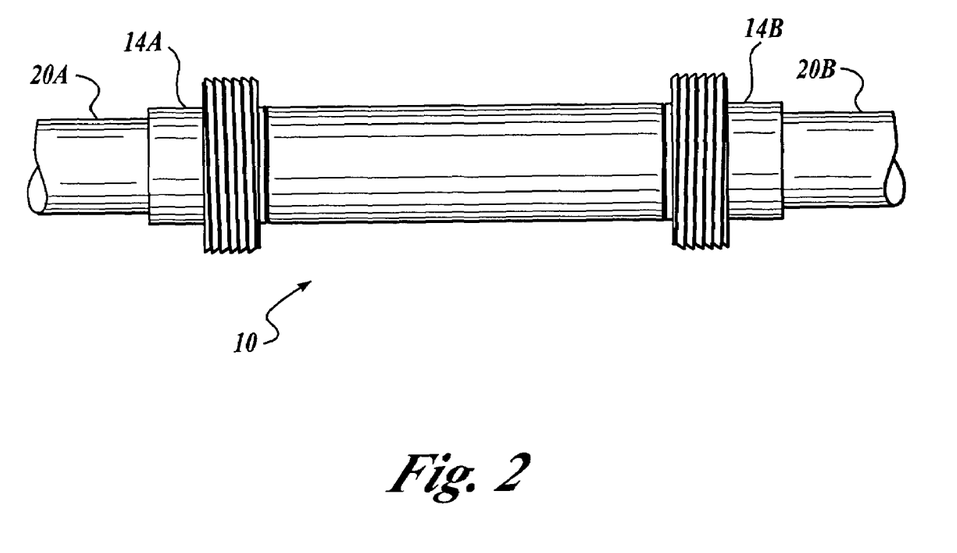
FIG. 2 is a side view of a fitting and pipe section connected to a tubing segment.

Referring to FIG. 2, the fitting and pipe section assembly 10 is capable of being installed in tubing 20A and 20B of a jetted bath. The inlet and outlet end portions 14A and 14B may be coupled in fluid flow communication to an inlet and an outlet of the tubing 20A and 20B respectively. The fitting and pipe section assembly 10 may be coupled to the tubing 20A and 20B by adhesive, corresponding grooves and threads, or other known methods. Although FIG. 2 shows tubing 20 secured inside of the fitting and pipe section assembly 10, it will be understood that the fitting and pipe section assembly 10 could also be sized so that tubing 20 could be secured on the outer surface of the fitting and pipe section assembly 10.

Figure 3:
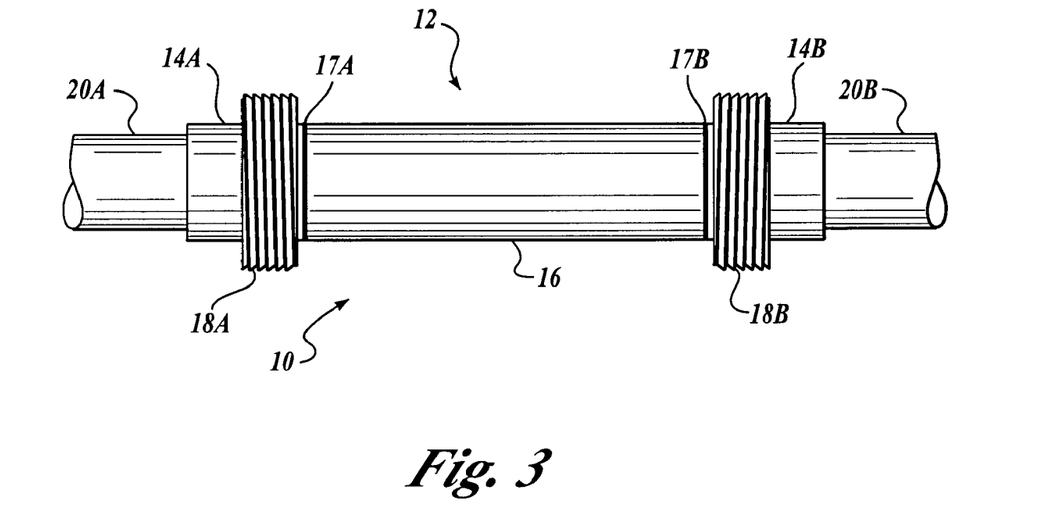
FIG. 3 is a side view of a fitting and pipe section where the center segment has been removed.

Referring to FIG. 3, the pipe section 12 may be cut along the first and second indicia 17A and 17B. As shown in FIG. 3, the indicia 17A and 17B may be annular grooves in the pipe section 12. These annular grooves act as both a visual guide for where to cut the pipe section 12, but also act to physically guide and center a cutting device. The cutting device may be a blade, cable saw, or any similar device. In a preferred embodiment, the cutting device is a cable saw, which is automatically centered within the groove during cutting. Further, the fitting and pipe section assembly 10 may include the cutting device assembled therewith, such as a cable saw threaded through a polymeric tubing with its ends connected by swaging, wire, or polymeric tie. Once the cutting device has fully cut pipe section 12 along both the first and second indicia 17A and 17B, the center segment 16 may be removed laterally from the pipe section 12, without any longitudinal or lateral displacement of the remaining inlet and outlet portions 14A and 14B. Thus the annular grooves ensure that there is proper spacing for inserting the close fit device 30 (see FIG. 4), and that the inlet and outlet portions 14A and 14B have been cut straight and plumb. The removal of center segment 16 leaves the inlet and outlet portions 14A and 14B, including the first and second fittings 18A and 18B, connected to tubing 20A and 20B.

Referring to FIG. 3-6, once the center segment 16 is removed, the resulting gap has an exact longitudinal dimension to accept a close fit device 30, and outer seals 49A and 49B, between the inlet and outlet portions 14A and 14B of the fitting and pipe section assembly 10. In one embodiment, the indicia 17A and 17B are not placed flush with the fittings 18A and 18B, and are instead positioned a select distance along pipe section 12 away from the fittings 18A and 18B. This results in fitting lips 19A and 19B being formed when the center segment 16 is removed. The fitting lips are preferably the same width as the outer seals 49A and 49B, and assist in retaining the outer seal 49A and 49B in place against the fittings 18A and 18B. Alternatively outer seals 49A and 49B may include raised portions which can be inserted into corresponding recesses in the vertical faces of fittings 18A and 18B to hold outer seals 49A and 49B in place.

It will be understood that the term "close fit device" 30 as used herein includes a heater device for use in fluid flow communication with a jetted bath, that has a predetermined length which is received between stationary inlets and outlets separated by substantially the same predetermined distance as the length of the device, including outer seals 49A and 49B if necessary, such that it may be installed and/or removed without displacement of the inlet and outlet. Thus, a close fit device 30 may include but is not limited to a heater that includes split nuts as in the embodiment described above. Alternately, the close fit device 30 may include a different fastening assembly construction that allows close fit installation, such as a heater housing utilizing a two piece split nut assembly secured by nuts and bolts or screws that may be slid back sufficiently on the heater body for installation and removal, or a two piece nut and split retaining ring assembly such as is disclosed in U.S. Pat. No. 5,775,743 issued to Rochelle, or a split thread nut assembly such as is disclosed in U.S. Pat. No. 6,460,901 issued to Rochelle, disclosures of both of which are hereby expressly incorporated by reference, or other well known constructions. The close fit device 30 for use with the present invention includes a main body 32, and inlet and outlet 34A and 34B for fluid flow communication with the jetted bath tubing 20A and 20B located at either ends of main body 32. The close fit device 30 also includes flanges 36A and 36B located respectively at the inlet and outlet ends 34A and 34B of close fit device 30.

Further still, it should be apparent to those skilled in the art that non-close fit devices are also suitable for, use with the present invention, such as devices adjustable in length or form to permit insertion of the device between two stationary inlets and outlets. For instance, the present invention is suitable for use with flexible piping, such as PVC piping, wherein the flexible piping is flexible enough to allow the flexible piping with attached end fittings to be inserted between the two stationary inlets and outlets without sliding back the end fittings back upon the flexible piping.

Figure 4:
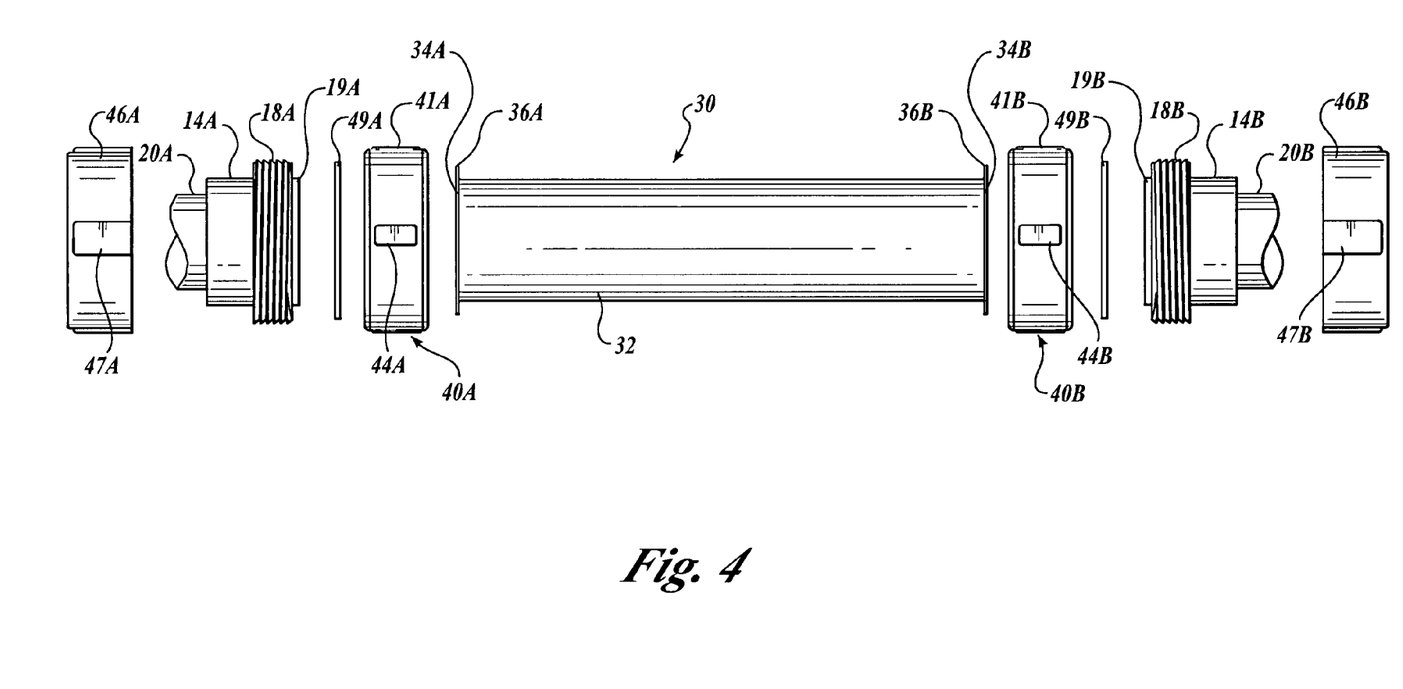
FIG. 4 is an exploded view of a fitting and pipe section where the center segment has been removed and replaced with a close fit device and a split nut fastening assembly.
Figure 5:
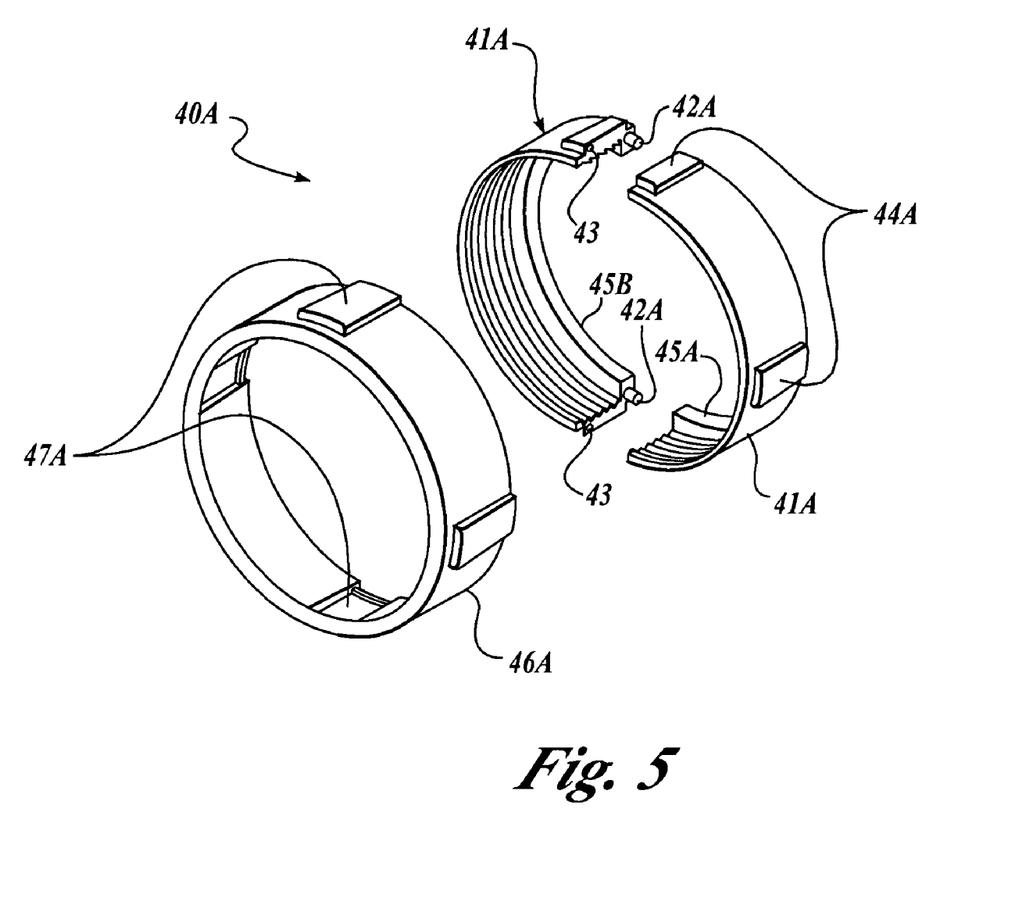
FIG. 5 is a perspective view of a split nut fastening assembly.
Figure 6:
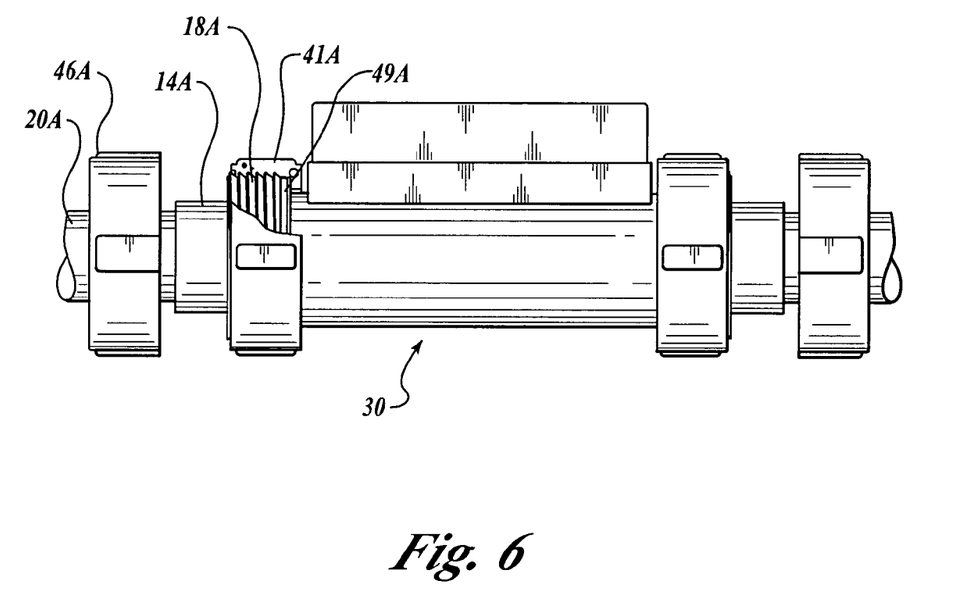
FIG. 6 is a cut away view of a fitting and pipe section where the pipe section has been removed and replaced with a close fit device and a split nut fastening assembly.

Referring to FIGS. 4-6, the close fit device 30 may be removably secured to the first and second fittings 18A and 18B by a first and second fastening assembly 40A and 40B. In one embodiment shown in FIGS. 4-6, fastening assembly 40A includes a two piece split nut 41A and a nut cover 46A. The fastening assembly 40A preferably also includes an outer seal 49A. The split nut 41A includes locking pins 42A, locking apertures 43, locking tabs 44A, and split nut lip 45A. The locking pins 42A and locking apertures 43 are located along the surfaces dividing the two pieces of split nut 41A. The two pieces of split nut 41A may be removably secured together by locking pins 42A engaging locking apertures 43. The locking tabs 44A are raised projections located on the outer surface of split nut 41A. The nut cover 46A includes locking tab channels 47A, that engage the corresponding locking tabs 44A of split nut 41A. Thus the locking tab channels 47A hold the split nut in place when the fastening assembly 40A is assembled. Fastening assembly 40B is a mirror image of fastening assembly 40A.

To removably seal the close fit device 30 in fluid flow communication with the tubing 20 of the jetted bath, the first and second nut covers 46A and 46B are slidably placed about tubing 20A and 20B respectively. The first and second outer seals 49A and 49B may be positioned between the fittings 18A and 18B respectively and close fit device 30. Once the close fit device 30 is placed between the pipe inlet and outlet ends 14A and 14B, the first and second split nuts 41A and 41B may be slidably secured about the close fit device 30 connecting the two pieces of the split nuts 41A and 41B by inserting locking pins 42A and 42B into and engaging locking apertures 43. Split nuts 41A and 41B rotatably engage the first and second fittings 18A and 18B respectively. The split nut lips 45A and 45B (see FIG. 5) likewise engage the close fit flanges 36A and 36B respectively, thus securing the close fit device to the fittings 18A and 18B. The nut covers 46A and 46B may now be slid so that the locking tab channels 47A and 47B engage the corresponding locking tabs 44A and 44B thus preventing the locking pins 42A and 42B from disengaging locking apertures 43. If the split nuts 41A and 41B are not tightly secured about fittings 18A and 18B, then the nut covers 46A and 46B and the split nuts 41A and 41B may be additionally rotated to tighten the connection between the fittings 18A and 18B and the close fit device 30.

Figure 7:
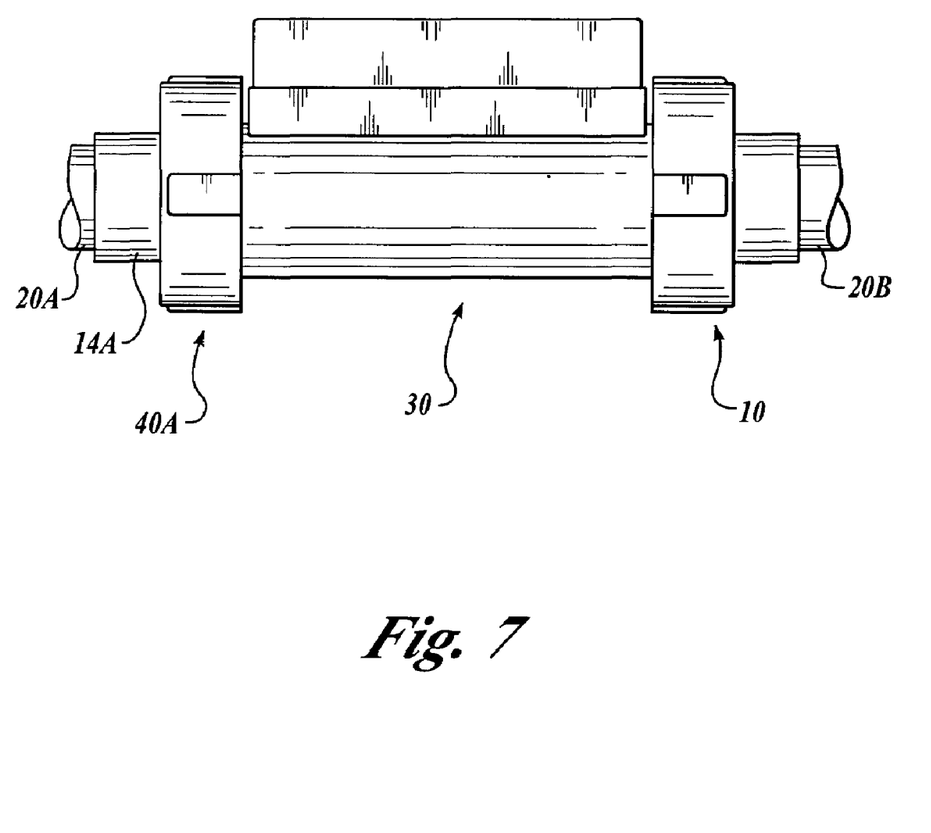
FIG. 7 is a perspective view of a fitting and pipe assembly where the pipe section has been removed and replaced with a close fit device and a split nut fastening assembly.

Referring to FIG. 7, the fitting and pipe section 10 is shown with a close fit device 30 fully installed and in fluid flow communication with the tubing 20A and 20B of a jetted bath.

Figure 8:
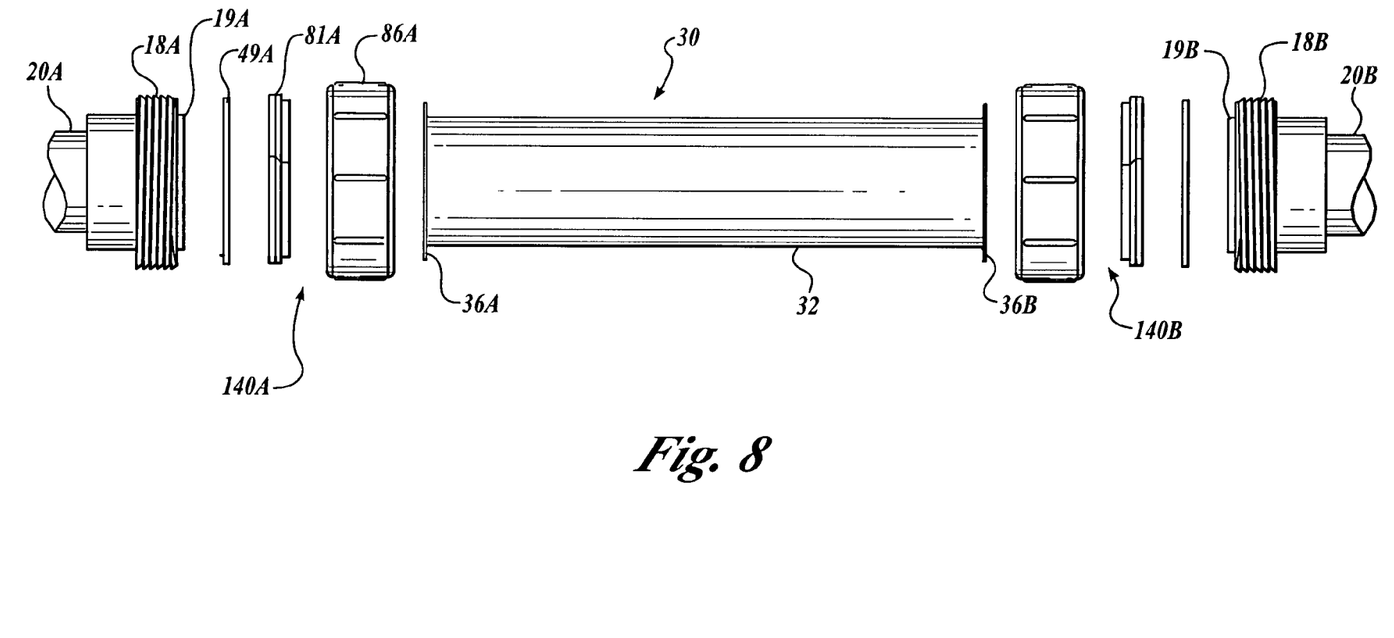
FIG. 8 is an exploded view of a fitting and pipe section where the pipe section has been removed and replaced with a close fit device and a union nut fastening assembly.

Referring to FIG. 4, it will be understood that the fastening assembly 40A and 40B not limited to those embodiments described herein, but also encompasses any fastener or fastener assembly capable of securing the close fit device 30 to fittings 18A and 18B. Referring to FIG. 8, an alternative embodiment of the fastening assembly 140A is shown. The alternative fastening assembly 140A includes a split nut retainer 81A, union nut 86A and the outer seal 49A. When used to secure the close fit device 30 in fluid flow with the tubing 20A and 20B of the jetted bath, union nut 86A is slid about the close fit device before the close fit device is inserted between the fittings 18A and 18B. Next, the two pieces of split nut retainer 81A can be slidably and removably secured about close fit device 30 between the flange 36A and the union nut 86A. The union nut 86A rotatably engages the fitting 18A and the outer edge of the split nut retainer 81A. The inner edge of the split nut retainer also engages the close fit device flange 36A, allowing union nut 86A to secure the close fit device 30 to the fitting 18A. In another embodiment, a union nut could be slidably secured on the main body 32 of the close fit device 30 by placing the union nut about the main body 32 prior to formation of flanges 36A and 36B, and securing the union nut with the subsequent formation of flanges 36A and 36B. Alternatively, split nuts whose halves can be secured together, for example by either screws or nut and bolt pairs connecting the halves, could also be used as fastening assembly 140A or 140B.

Figure 9:
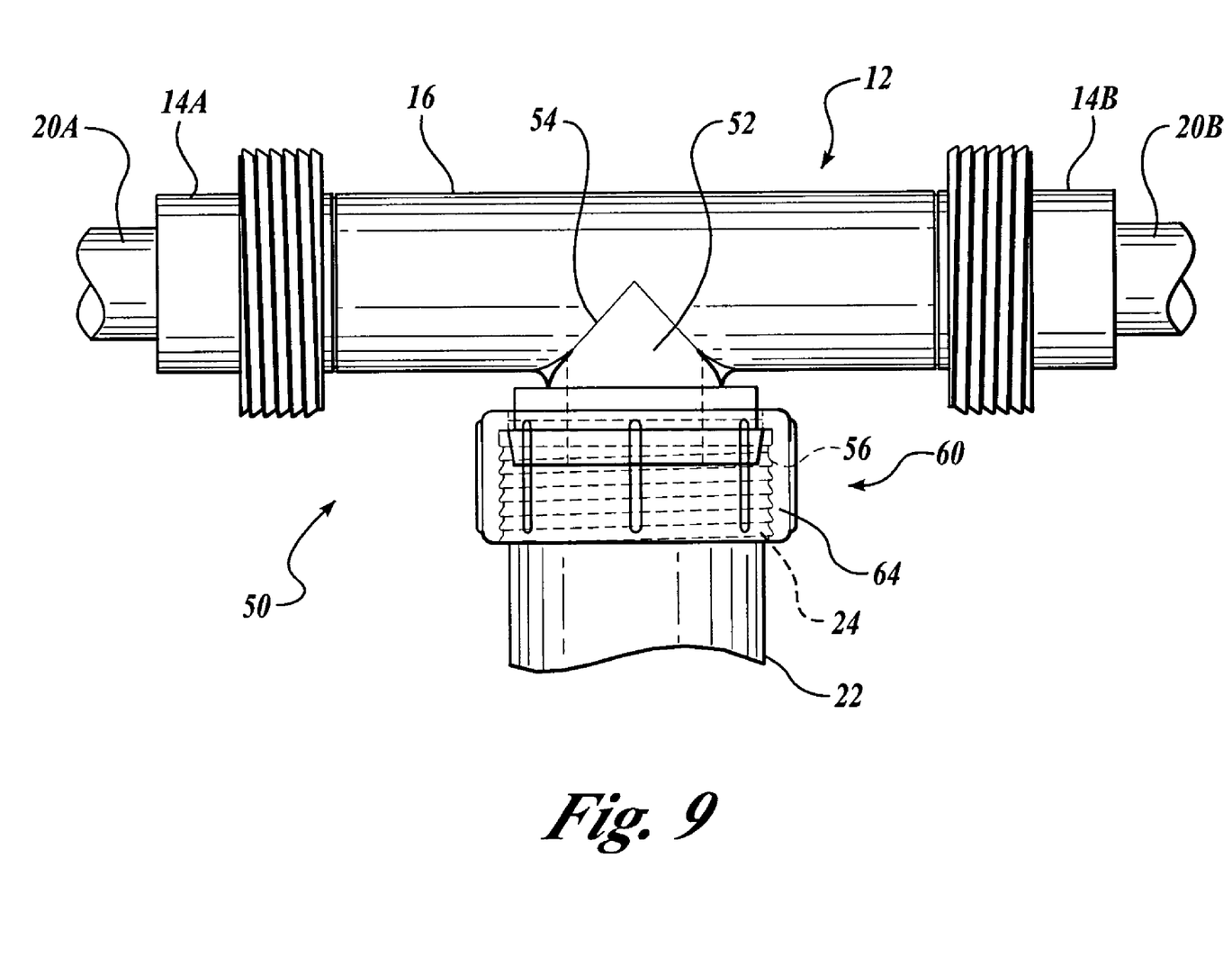
FIG. 9 is a side view of a T shaped fitting and pipe section according to the present invention.
Figure 10:
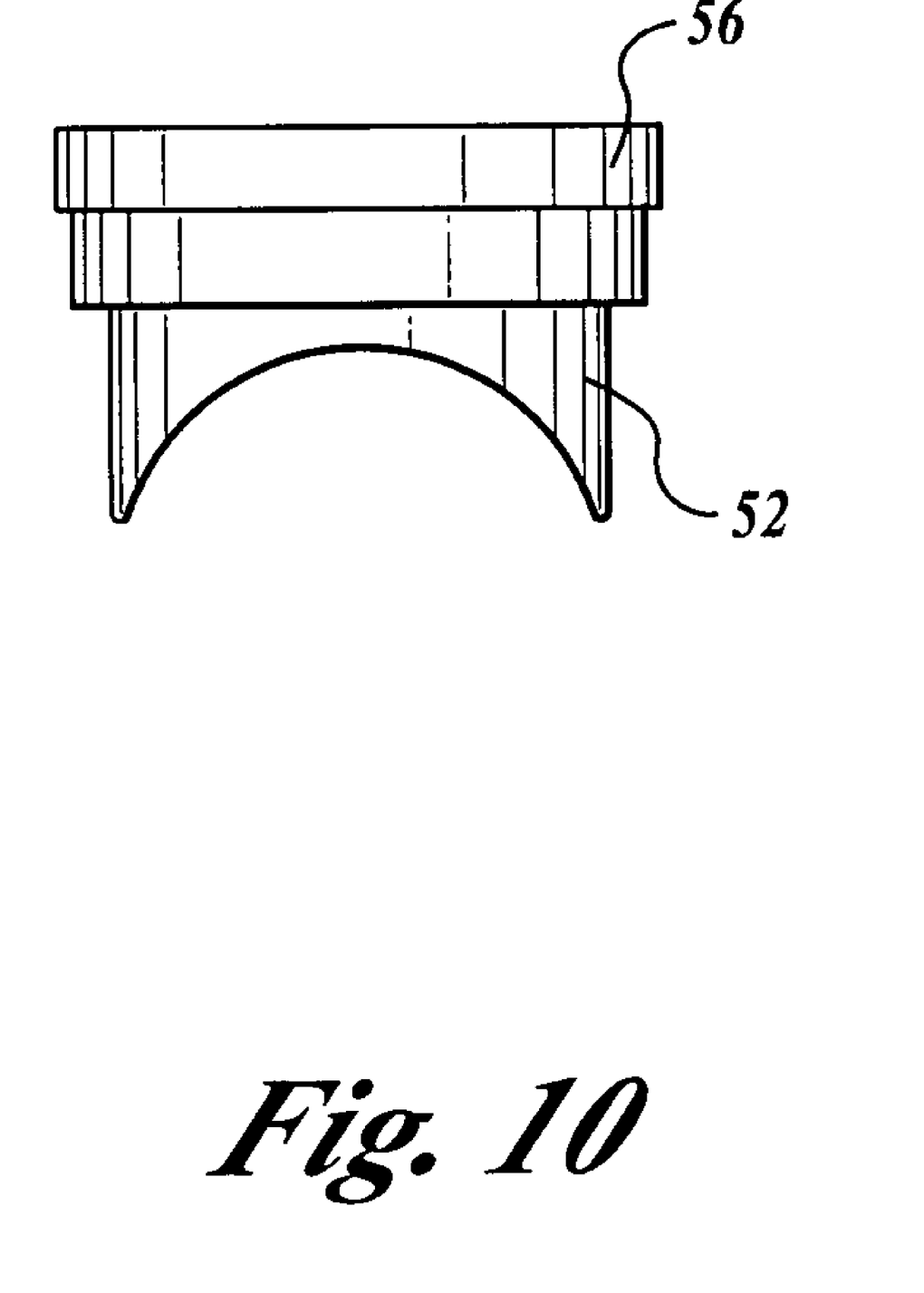
FIG. 10 is a side view of a transverse pipe branch of a T shaped fitting and pipe assembly.

In a second embodiment of the present invention a "T" shaped fitting and pipe section assembly 50 constructed in accordance with the present invention is shown in FIGS. 9 and 10. The fitting and pipe section assembly 50 includes a "T" junction with a transverse aperture 54 in the pipe section 12 between the inlet and outlet 14A and 14B. A transverse pipe branch 52 defining a port extends perpendicular to the pipe section 12 and is connected in fluid flow communication with the transverse aperture 54. The transverse pipe branch 52 includes a transverse flange 56.

In the second embodiment the fitting and pipe section 50 is further capable of being installed with a transverse segment of tubing 22 of a jetted bath. The fitting and pipe section 50 may be removably secured to the transverse tubing segment 22 by transverse fastening assembly 60. In one embodiment shown in FIG. 9, fastening assembly 60 includes a union nut 64. The fastening assembly 60 preferably also includes an inner seal, such as the inner seal 78 depicted in FIG. 11. The union nut 64 can be slidably retained about the transverse pipe branch 52 by the transverse flange 56. Tubing 22 includes a transverse fitting 24 located at the end of tubing 22. The union nut 64 may removably engage the fitting and pipe section 50 to the tubing 22 by rotatably sealing fitting 24 to the transverse pipe branch 52. Additionally an inner seal may be provided that is captured between the fitting 24 and the transverse pipe branch 52.

It will be understood that alternative elements may be provided for removably engaging the pipe branch 52 to the tubing 22 without departing from the present invention. For example, in another embodiment, the transverse pipe branch 52 could be provided with a fitting and the transverse tubing segment 22 could be provided with a nut to removably engage the transverse pipe branch 52. Additionally, the union nut 64 could be replaced with a fastening assembly similar to those described above, including split nut 41A and nut cover 46A (see FIG. 4), or a split nut retainer 81A and union nut 86A (see FIG. 8).

The center segment 16 may be removed in a similar manner to that provided in the first embodiment. However, if the transverse pipe branch is connected to the center segment 16 of pipe section 12, then the nut 56 must be rotatably disengaged from transverse tube fitting 24 for complete removal of center segment 16.

Figure 11:
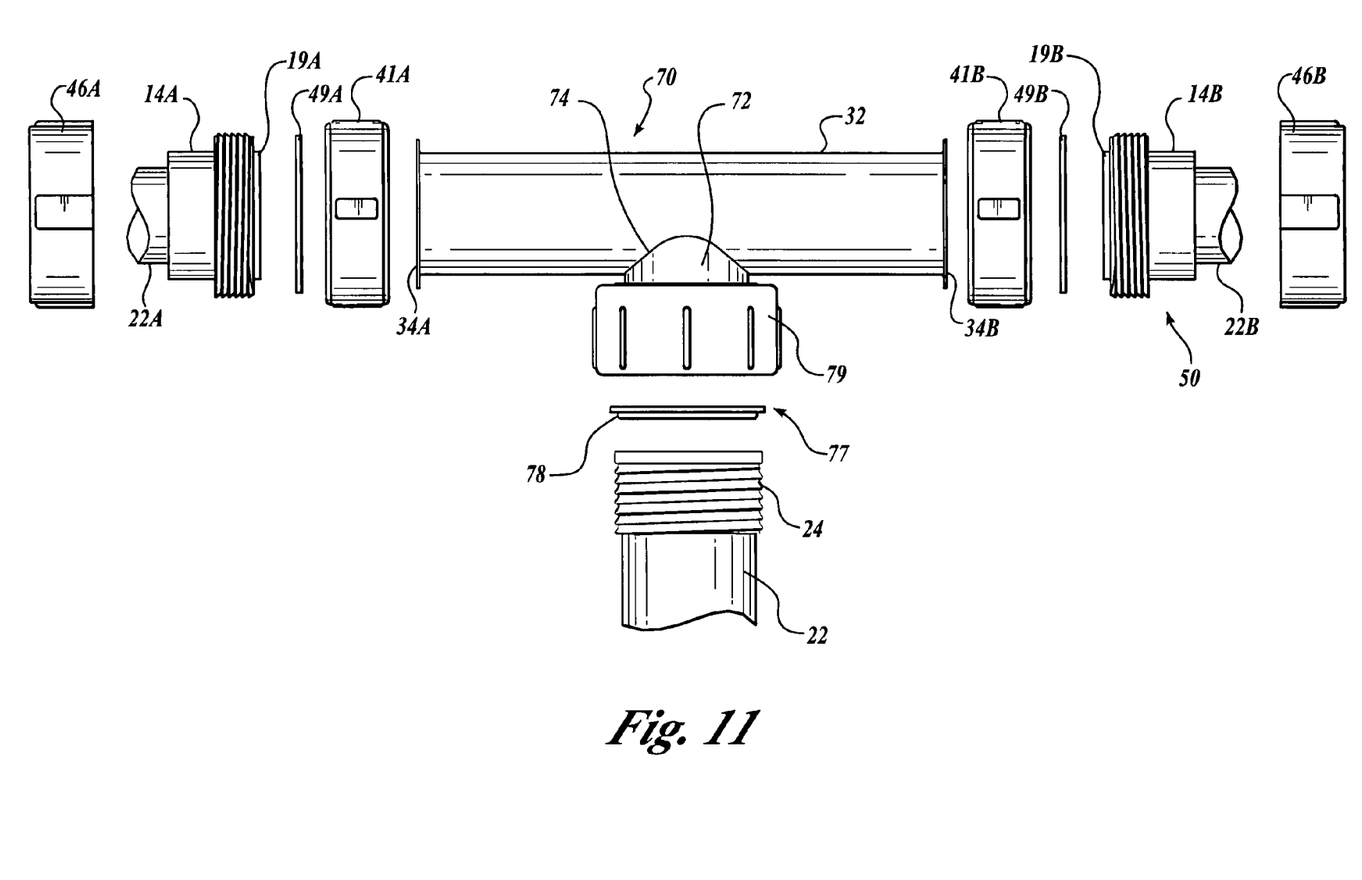
FIG. 11 is an exploded view of a T shaped fitting and pipe section where the pipe section has been removed and replaced with a T shaped close fit device and a split nut fastening assembly.
Figure 12:
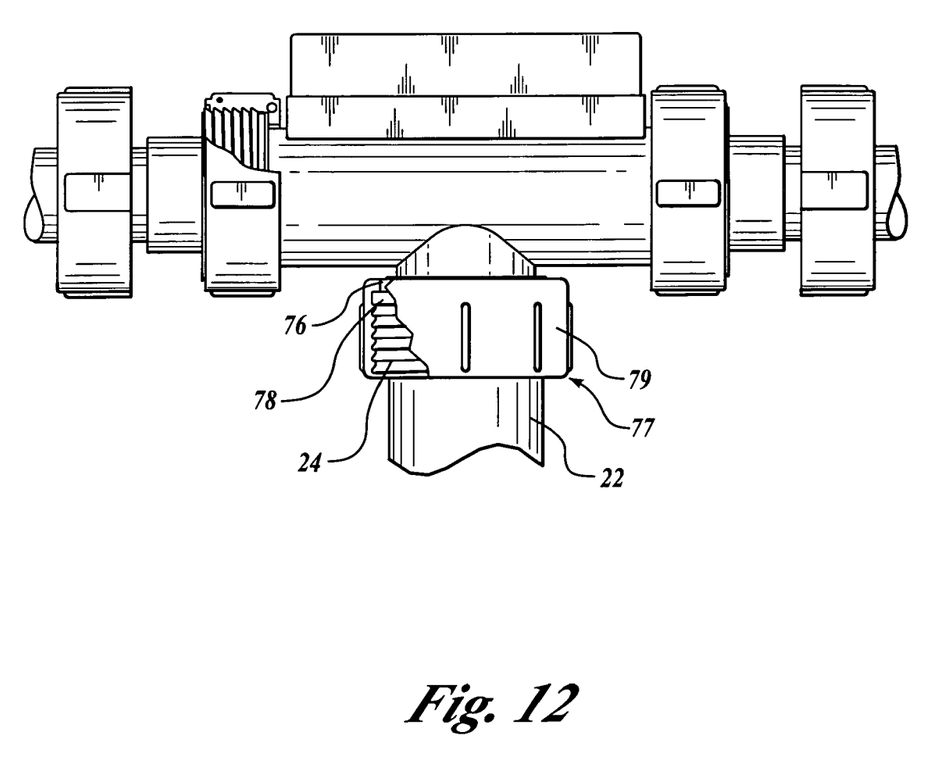
FIG. 12 is a cut away view of a T shaped fitting and pipe section where the pipe section has been removed and replaced with a T shaped close fit device and a split nut fastening assembly.
Figure 13:
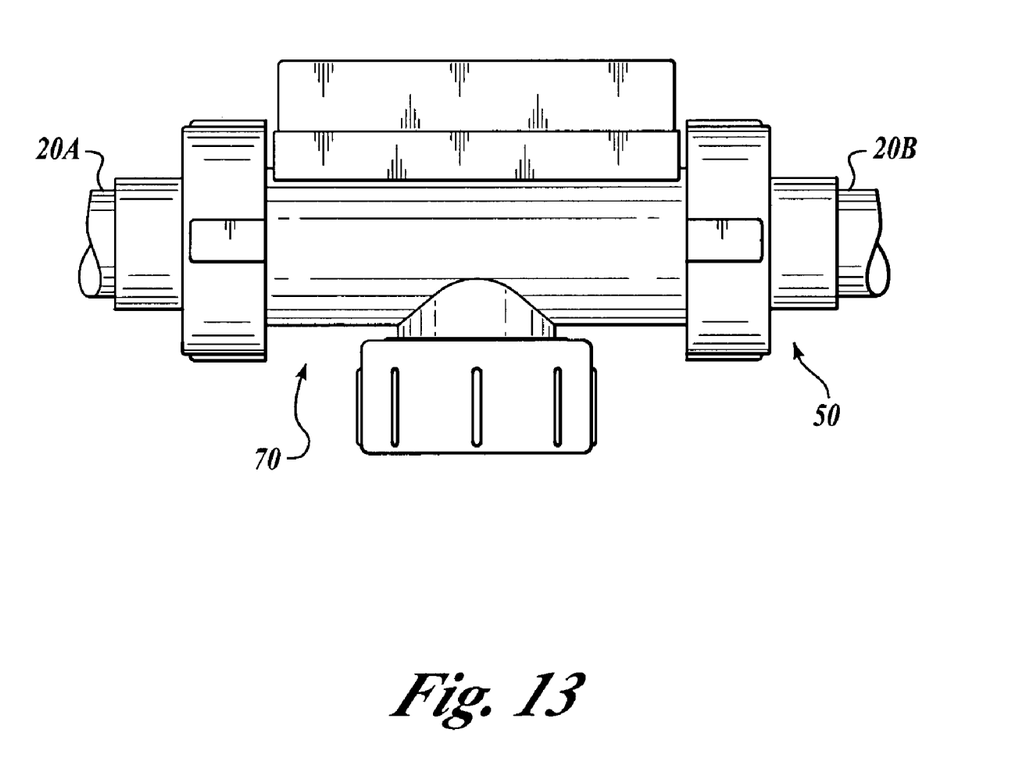
FIG. 13 is a perspective view of a T shaped fitting and pipe section where the pipe section has been removed and replaced with a T shaped close fit device and a split nut fastening assembly.

Referring to FIG. 11-12, once the center segment is removed, the T shaped fitting and pipe section assembly 50 may accept a T shaped close fit device 70 between the inlet and outlet portions 14A and 14B. The T shaped close fit device 70 for use with the present invention includes a transverse aperture 74 between the inlet and outlet 34A and 34B. A transverse pipe branch 72 defining a port extends perpendicular to the close fit device main body 32 and is connected in fluid flow communication with the transverse aperture 74. The transverse pipe branch 72 includes a transverse flange 76. The close fit device 70 may be removably secured to the transverse tubing segment 22 by close fit transverse fastening assembly 77. In one embodiment fastening assembly 77 includes a union nut 79. The fastening assembly 77 preferably also includes an inner seal 78. The union nut 79 can be slidably retained about the transverse pipe branch 72 by the-transverse flange 76. The union nut 79 may removably engage the close fit device 70 to the tubing 22A and 22B by rotatably sealing fitting 24 to the transverse pipe branch 72. Additionally an inner seal 78 may be provided that is captured between the fitting 24 and the transverse pipe branch 72. Installation is completed with the fitting and pipe section 50 being secured to the close fit device 70 in the same manner as in the first embodiment. Referring to FIG. 13, the T shaped fitting and pipe section 50 is shown with a T shaped close fit device 70 fully installed and in fluid flow communication with the tubing 20A and 20Bof a jetted bath.

In the second embodiment described above, the transverse pipe branch 52 and close fit transverse pipe branch 72 are shown as being centered along the fitting and pipe assembly 50 and close fit device 70 respectively. In another embodiment, transverse pipe branch 52 and close fit transverse pipe branch 72 may be positioned off center.

Referring to FIG. 1, in another embodiment, the center segment 16 may be removably attached to the inlet and outlet portions 14A and 14B of pipe section 12. In this alternative embodiment indicia 17A and 17B are not included, because cutting the fitting and pipe section 10 would be unnecessary. In this embodiment, the center segment could include flanges at its outlet and inlet ends, and could be removably attached to fittings 18A and 18B by fastening assembly 40A and 40B (see FIG. 4).

In an alternative embodiment, the indicia 17A and 17B may include visual guides, including but not limited to paint. This is not preferred, since it is advantageous to physically guide the cutting device to assist in ensuring an acceptable cut.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of modifying a jetted bath to accept a close fit heater device using a fitting and pipe section assembly adapted to be installed in a segment of tubing of the jetted bath, comprising:
   (a) cutting a fitting and pipe section assembly along a first indicia disposed at a first end of a center segment of the fitting and pipe section assembly;
   (b) removing the center segment from the fitting and pipe section assembly and defining a gap between a first end fitting and a second end fitting of the fitting and pipe section assembly;
   (c) inserting a close fit heater device in the gap; and
   (d) securing the close fit heater device in fluid communication with the first and second end fittings with a fastening assembly.

2. The method of claim 1, further including cutting the fitting and pipe section assembly along a second indicia disposed at a second end of the center segment of the fitting and pipe section assembly.

3. The method of claim 1, further including inserting the close fit heater device in the gap without substantially displacing the first and second end fittings.

4. The method of claim 1, further comprising inserting a seal between the first end fitting and the close fit heater device when the close fit heater device is inserted within the gap to provide a fluid seal therebetween.

5. The method of claim 1, wherein the fastening assembly comprises a split nut and a nut cover.

6. The method of claim 5, further comprising:
   (a) sliding the nut cover over the first end fitting prior to inserting the close fit heater device in the gap;
   (b) securing the close fit heater device to the first end fitting with the split nut; and
   (c) positioning the nut cover to engage the split nut so as to retain a first portion and a second portion of the split nut together.

7. The method of claim 1, wherein the fastening assembly comprises a nut and a split retainer.

8. The method of claim 7, further comprising:
   (a) sliding the nut over an end of the close fit heater device prior to insertion of the close fit heater device in the gap; and
   (b) securing a first portion and a second portion of the split retainer around the close fit heater device.

9. The method of claim 8, wherein the split retainer retains the nut on the end of the close fit heater device when the nut couples the close fit heater device in fluid communication with the first end fitting.

10. The method of claim 1, wherein the first and second end fittings face one another to permit the coupling of the close fit heater device therebetween.

11. A method of forming a fitting and pipe section assembly to permit mounting of a close fit heater device in fluid communication with a segment of tubing of a jetted bath, comprising:
   (a) forming a first end fitting on a first end of a pipe section;
   (b) forming a second end fitting on a second end of the pipe section wherein the first and second end fittings face one another;
   (c) forming a first indicia between the first end fitting and the second end fitting to guide cutting of the pipe section; and
   (d) forming a second indicia between the first end fitting and the second end fitting to guide the cutting of the pipe section.

12. The method of claim 11, further comprising spacing the first and second indicia from the first and second end fittings respectively to form lips disposed between the first and second end fittings and the respective first and second indicia.

13. The method of claim 11, further comprising forming a split nut for coupling the first end fitting to the close fit heater device once a center segment of the pipe section is removed and interchanged with the close fit heater device.

14. The method of claim 13, further comprising forming a nut cover for encircling the split nut to retain a first portion of the split nut in engagement with a second portion of the split nut around the close fit heater device.

15. The method of claim 11, further comprising forming a seal adaptable to be inserted between the first end fitting and the close fit heater device when a center segment of the pipe section is removed and interchanged with a close fit heater device.

16. The method of claim 11, further comprising forming a nut and a split retainer, wherein the nut may be slipped over an end of the close fit device and retained on the end of the close fit device by engagement with the split retainer positioned to at least partially encircle the close fit device.

17. A method of modifying a segment of tubing of a jetted bath to accept a close fit heater device, comprising:
   (a) forming a first end fitting on a first end of a pipe section;
   (b) forming a second end fitting on a second end of the pipe section;
   (c) coupling the first and second end fittings in fluid communication with a segment of tubing of a jetted bath;
   (d) forming a first cutting guide between the first end fitting and the second end fitting to guide the post installation cutting and removal of a center segment of the pipe section; and
   (e) forming a second cutting guide between the first end fitting and the second end fitting to guide the post installation cutting and removal of the center segment.

18. The method of claim 17, wherein the first and second end fittings are each formed to include a fastener adaptable to couple to the close fit heater device.

19. The method of claim 17, further comprising spacing indicia from the first and second end fittings to form lips disposed between the first and second end fittings and the respective first and second cutting guides.

20. The method of claim 17, further comprising forming a split nut for coupling the first end fitting to the close fit heater device once the center segment of the pipe section is removed and interchanged with the close fit heater device.

21. The method of claim 20, further comprising forming a nut cover for encircling the split nut to retain a first portion of the split nut in engagement with a second portion of the split nut around the close fit heater device.

22. The method of claim 17, further comprising forming a seal adaptable to be inserted between the first end fitting and the close fit heater device when the center segment of the pipe section is removed and interchanged with the close fit heater device.

23. The method of claim 17, further comprising forming a nut and a split retainer, wherein the nut may be slipped over an end of the close fit device and retained on the end of the close fit device by engaging the split retainer positioned to at least partially encircle the close fit device.

24. A method of forming a fitting and pipe section assembly to permit mounting of a close fit heater device in fluid communication with a segment of tubing of a jetted bath, comprising:
  (a) forming a first end fitting on a first end of a pipe section;
  (b) forming a second end fitting on a second end of the pipe section wherein the first and second end fittings face one another;
  (c) forming a first indicia between the first end fitting and the second end fitting to guide cutting of the pipe section;
  (d) forming a second indicia between the first end fitting and the second end fitting to guide the cutting of the pipe section; and
  (e) spacing the first and second indicia from the first and second end fittings respectively to form lips disposed between the first and second end fittings and the respective first and second indicia.

25. A method of forming a fitting and pipe section assembly to permit mounting of a close fit heater device in fluid communication with a segment of tubing of a jetted bath, comprising:
  (a) forming a first end fitting on a first end of a pipe section;
  (b) forming a second end fitting on a second end of the pipe section wherein the first and second end fittings face one another;
  (c) forming a first indicia between the first end fitting and the second end fitting to guide cutting of the pipe section;
  (d) forming a second indicia between the first end fitting and the second end fitting to guide the cutting of the pipe section; and
  (e) forming a split nut for coupling the first end fitting to the close fit heater device once a center segment of the pipe section is removed and interchanged with the close fit heater device.

26. A method of forming a fitting and pipe section assembly to permit mounting of a close fit heater device in fluid communication with a segment of tubing of a jetted bath, comprising:
  (a) forming a first end fitting on a first end of a pipe section;
  (b) forming a second end fitting on a second end of the pipe section wherein the first and second end fittings face one another;
  (c) forming a first indicia between the first end fitting and the second end fitting to guide cutting of the pipe section;
  (d) forming a second indicia between the first end fitting and the second end fitting to guide the cutting of the pipe section; and
  (e) forming a seal adaptable to be inserted between the first end fitting and the close fit heater device when a center segment of the pipe section is removed and interchanged with a close fit heater device.

27. A method of forming a fitting and pipe section assembly to permit mounting of a close fit heater device in fluid communication with a segment of tubing of a jetted bath, comprising:
  (a) forming a first end fitting on a first end of a pipe section;
  (b) forming a second end fitting on a second end of the pipe section wherein the first and second end fittings face one another;
  (c) forming a first indicia between the first end fitting and the second end fitting to guide cutting of the pipe section;
  (d) forming a second indicia between the first end fitting and the second end fitting to guide the cutting of the pipe section; and
  (e) forming a nut and a split retainer, wherein the nut may be slipped over an end of the close fit device and retained on the end of the close fit device by engagement with the split retainer positioned to at least partially encircle the close fit device.

* * * * *